US008385290B2

(12) United States Patent
Kato et al.

(10) Patent No.: US 8,385,290 B2
(45) Date of Patent: Feb. 26, 2013

(54) METHOD AND APPARATUS FOR HANDLING A LOCAL BREAKOUT SESSION

(75) Inventors: Ryoji Kato, Kanagawa (JP); Toshikane Oda, Tokyo (JP); Shinta Sugimoto, Tokyo (JP)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 219 days.

(21) Appl. No.: 12/744,884

(22) PCT Filed: Nov. 30, 2007

(86) PCT No.: PCT/SE2007/001040
§ 371 (c)(1),
(2), (4) Date: May 26, 2010

(87) PCT Pub. No.: WO2009/070061
PCT Pub. Date: Jun. 4, 2009

(65) Prior Publication Data
US 2010/0272063 A1     Oct. 28, 2010

(51) Int. Cl.
*H04W 4/00*    (2009.01)
(52) U.S. Cl. ...................................................... 370/331
(58) Field of Classification Search .................. 370/203,
370/204–215, 229–240, 241–253, 310–337,
370/338–350, 395.1, 395.3, 395.4, 395.41,
370/395.42, 395.5, 395.52, 395.53, 412–421,
370/431–457, 458–463, 464–497, 498–529,
370/523–520, 521–529
See application file for complete search history.

(56) References Cited

U.S. PATENT DOCUMENTS

| 7,840,217 | B2* | 11/2010 | Patel et al. ................... 455/439 |
| 7,885,248 | B2* | 2/2011 | Harper et al. ................. 370/349 |
| 8,000,299 | B2* | 8/2011 | Lee ................................ 370/331 |
| 8,005,093 | B2* | 8/2011 | Huang et al. .............. 370/395.5 |
| 8,051,198 | B2* | 11/2011 | Sudo ............................ 709/237 |
| 8,102,815 | B2* | 1/2012 | Krishnan ...................... 370/331 |
| 2002/0054584 | A1 | 5/2002 | Dempo |
| 2003/0224758 | A1* | 12/2003 | O'Neill et al. ............... 455/411 |
| 2004/0105408 | A1* | 6/2004 | Suh et al. ..................... 370/331 |
| 2004/0136348 | A1* | 7/2004 | Han ............................. 370/338 |
| 2004/0136384 | A1* | 7/2004 | Cho ............................ 370/401 |
| 2005/0007994 | A1 | 1/2005 | Fukuzawa et al. |
| 2005/0213540 | A1* | 9/2005 | Matsumoto ................. 370/331 |
| 2006/0018291 | A1* | 1/2006 | Patel et al. .................. 370/335 |
| 2006/0029020 | A1* | 2/2006 | Jung et al. .................. 370/331 |

(Continued)

FOREIGN PATENT DOCUMENTS

JP     A 2004-235862    8/2004

*Primary Examiner* — Kwang B Yao
*Assistant Examiner* — Jung-Jen Liu

(57) ABSTRACT

A method and apparatus for handling a Local Break Out (LBO) session taking place in a first network between a user equipment and a corresponding node (CN) is provided. For the downlink packets, embodiments include: converting, in a node in the first or the second network, the IP address of the downlink packets from an LHoA to a Global Home Address (GHoA) and routing, from the first node to a second node in the second network, any downlink packets being sent from the corresponding node, so that the downlink packets will arrive at the user equipment having a GHoA. For the uplink packets embodiments include: converting, in a node in the first or the second network, the IP address of the uplink packets from a GHoA to an LHoA and routing, from the second node to the first node, any uplink packets being sent from the user equipment; so that the uplink packets will arrive at the corresponding node with a source address that is an LHoA.

18 Claims, 14 Drawing Sheets

U.S. PATENT DOCUMENTS

| | | | |
|---|---|---|---|
| 2006/0062248 A1* | 3/2006 | Huang et al. | 370/466 |
| 2006/0153136 A1* | 7/2006 | Lee | 370/331 |
| 2007/0109998 A1 | 5/2007 | Hara et al. | |
| 2008/0062917 A1* | 3/2008 | Oguchi | 370/328 |
| 2008/0176560 A1* | 7/2008 | Dutta et al. | 455/433 |
| 2008/0207206 A1* | 8/2008 | Taniuchi et al. | 455/436 |
| 2008/0285518 A1* | 11/2008 | Dutta et al. | 370/331 |
| 2009/0016364 A1* | 1/2009 | Krishnan | 370/401 |
| 2009/0073935 A1* | 3/2009 | Xia et al. | 370/331 |
| 2009/0094693 A1* | 4/2009 | Patil | 726/12 |
| 2010/0027509 A1* | 2/2010 | Velev et al. | 370/331 |
| 2010/0172293 A1* | 7/2010 | Toth et al. | 370/328 |

* cited by examiner

Format 1

Transport
Protocol

Format 2

Transport
Protocol

METHOD AND APPARATUS FOR HANDLING A LOCAL BREAKOUT SESSION

TECHNICAL FIELD

The present invention relates to a method and an apparatus for providing and handling a local breakout session in a mobile network.

BACKGROUND

In a mobile network, when a user is using a network outside the home network, the user is said to be roaming. Any media sent from the user's mobile node in a visited network is sent via a visited domain gateway to a home domain gateway. The home domain gateway is located in the user's home network. The media is then passed to a network node, a so called corresponding node, for onward transmission or as the final destination of the media.

It may however be very inefficient to route all data traffic via the home network, particularly when a user is attached to a visited network. The term "local breakout (LBO)" (or sometimes also referred to as "route optimization") is used to refer to a situation when traffic from a mobile node (MN) in a visited network is not routed via the user's home network, but is instead routed in a different way. LBO could shorten the end-to-end route and reduce the load on the home network. See WO 2007/104324 A1 for an example of local breakout.

LBO relies upon that the MN is provided with at least two IP addresses, a Local Home Address (LHoA) that is managed by the visited network and used for the local breakout and a Global Home Address (GHoA) that is managed by the home network and used for global mobility. These IP addresses can be used by the MN as the situation or policy demands, however, it is sometimes not desired to use two IP addresses since this may cause some operational costs for the MN, e.g. it is not always clear which IP address can be used and for what purpose.

If only one IP address is to be used for the MN this IP address should be the GHoA. But by using only GHoA it would be impossible to perform a local breakout session since that would require that the MN was provided with an LHoA.

SUMMARY

An object of the present invention is therefore to provide a method and an apparatus that solves the above mentioned problems involved with local breakout when using only one IP address in the mobile node.

According to the present invention the handling of a Local Break Out (LBO) session is disclosed. The LBO session takes place in a first network between a user equipment and a corresponding node (CN) where downlink packets are being sent from the corresponding node to the user equipment and uplink packets are being sent from the user equipment to the corresponding node. The first network is provided with a first node that allocates a Local Home Address (LHoA). When the MN moves or roams from the first network to a second network a problem with handling or maintaining the LBO session arises. For the downlink packets this is solved by the steps of: converting, in a node in the first or the second network, the IP address of the downlink packets from an LHoA to a Global Home Address (GHoA) and routing, from the first node, directly or indirectly to a second node in the second network, any downlink packets being sent from the corresponding node, so that the downlink packets will arrive at the user equipment having a GHoA. For the uplink packets the problem is solved by converting, in a node in the first or the second network, the IP address of the uplink packets from a GHoA to an LHoA and routing, from the second node, directly or indirectly to the first node, any uplink packets being sent from the user equipment; so that the uplink packets will arrive at the corresponding node with a source address that is an LHoA.

An advantage with this method is that a local breakout session can take place by using only one IP address at the same time as the local breakout session is maintained even when the mobile node roams from one network to another.

According to a preferred embodiment the steps of converting IP addresses of the uplink and downlink packets are performed in the second node. This provides however that the second node is provided with functionality for converting IP addresses. This embodiment results in that the routing can be performed directly between the first and the second nodes without having to involve any further nodes. Preferably the conversions are performed in a node in the network most recently entered by the user equipment.

Alternatively only the conversion of the uplink or the downlink packets is performed in the second node or the node in the network most recently entered by the user equipment.

The introduction of the second node as the conversion node is preferably performed when the node receives an indication that the user equipment has entered the second network. Thereafter information is routed to a Global Mobility Management (GMM) stating that the node is provided with functionality for allocating an IP address in form of a Local Home Address (LHoA) for the user equipment. The GMM then sends information regarding the LBO session to the node whereupon the means for converting the IP address(-es) for uplink and/or downlink packets are set up.

According to an alternative embodiment the first node is decided to perform the conversion of IP addresses of the uplink and downlink packets. The setting up of the first node as conversion node is performed when the first node receives an indication that the user equipment has left the first network. Thereafter any downlink packets being sent from the corresponding node will be forwarded via a Global Mobility Management (GMM) to a node (second node) in the network (second network) entered by the user equipment.

According to a preferred embodiment all downlink packets are being forwarded from the first node to both a Global Mobility Management (GMM) and the user equipment as long as the user equipment is located in the first network. Thereby the loss of packets will be minimized when the user equipment roams to a different network.

In case the user equipment is located in the second network, all downlink packets are being forwarded from the first node to both a Global Mobility Management (GMM) and the second node in the second network. Thereby the second node will receive the downlink packets being sent from both the GMM and the first node. The loss of packets will thereby be minimized when/if the user equipment roams to a different network. Preferably one of these duplicated packets is dropped by the second node.

Preferably the information whether all downlink packets of the LBO session also should be sent to the GMM or not is included in a message sent from the GMM to a node, generally the first node, and/or in the Quality of Service specification. Thereby only packets in an LBO session of certain relevance will be duplicated.

According to an alternative embodiment the node that is decided to convert the IP address(-es) of the uplink and/or downlink packets sends further information about the node and the Local Home Address (LHoA) for said user equipment to the Global Mobility Management (GMM) after the LBO session has been established. Thereby a dynamic LHoA allocation will be achieved overcoming problems with limited address ranges.

In accordance with the invention the nodes are preferably Local Mobility Management (LMM) nodes or Mobile Access Gateway (MAG) nodes. In case a node is an MAG; LBO messages, i.e. messages used in the set up of an LBO session, all messages between the MAG and the GMM will preferably be routed via an LMM connected to the MAG.

According to an embodiment of the invention IPv4 addresses will be modified and sent in an IPv6 format and with fields containing at least information of LHoA, port and transport protocol. This is mainly to be used for LBO messages and routing update requests/responses. Thereby the problem with a limited range of IPv4 addresses can be evaded without impacting the standard.

According to the invention the conversion of IP addresses are preferably performed by a Network Address Translator (NAT) located in the first or the second node or by using Mobile Internet Protocol version 6.

The invention has a low impact on existing protocols and is applicable to both PMIPv6 protocols and EPC architecture. Messages in an LBO session can thus be extended to existing mobility protocols.

According to the invention an indication that the user equipment has left a network comes preferably from an MAG, an LMM, a GMM, a Radio Access Network and/or the link-layer. The invention thus provides a great flexibility in the large amount of possible ways to detect the absence of the user equipment.

According to the present invention, a node for handling a Local Break Out (LBO) session is also disclosed. The LBO session takes place in a first network between a user equipment and a corresponding node (CN). The node comprises an indicator, i.e. some form of detecting means that indicates, or a receiver for receiving an indication, that the user equipment has been detached from the node and has been moved to a second network. The node also comprises a router so that any downlink packets being sent from the corresponding node can be routed, directly or indirectly to a second node located in the second network and a router for routing any uplink packets being sent from the user equipment to the CN via the second node. This routing procedure can be performed by one router or by two or more routers. The node also comprises a converter for converting the IP address of the downlink packets from an LHoA to a Global Home Address (GHoA) and a converter for converting the IP address of the uplink packets from a GHoA to an LHoA. This converting can be performed by one or more converters, e.g. a Network Address Translator (NAT). The node is configured such that a local break out session can be maintained via at least said node and said second node when the user equipment moves from the first network to the second network.

By using a node according to the invention a local breakout session can take place by using only one IP address at the same time as the local breakout session is maintained even when the mobile node roams from the node's network to another.

Disclosed is also a node for handling a Local Break Out (LBO) session between a corresponding node and a user equipment taking place in a first network separate from the node, when the user equipment roams to the node's network. The node comprises an indicator, i.e. some form of detecting means that indicates, and/or a receiver for receiving an indication, that the user equipment has been moved from the first network and has been attached to the node. It further comprises a transmitter for sending information to a Global Mobility Management (GMM) stating that the node is provided with one or more converters for converting IP addresses and a receiver for receiving information regarding any LBO session the user equipment is involved in. The node further comprises means for setting up the converters for converting the IP addresses of the downlink and uplink packets for any LBO session the user equipment is involved in, and one or more routers for routing packets between the node that previously handled the LBO session and the user equipment. One single router can be arranged to handle the routing of both the downlink and the uplink packets and the router can e.g. be a mobility agent. Thereby a local break out session can be maintained via at least said node and the first node that previously handled the LBO session when the user equipment moves to the node's network. The need for routing packets via the GMM is thus eliminated.

By using a node according to the invention a local breakout session can take place by using only one IP address at the same time as the local breakout session is maintained even when the mobile node roams to the node's network from a network in which the LBO session previously took place.

The node can further be provided with means for duplicating downlink packets and means for caching packets, e.g. a memory. Thereby the loss of packets will be minimized when the user equipment roams to a different network.

The node can be in the form of a Local Mobility Management (LMM) or a Mobile Access Gateway (MAG).

The invention will now be more closely described with the aid of embodiments and with reference to enclosed drawings.

BRIEF DESCRIPTION OF THE DRAWINGS

Reference will now be made, by way of example, to the accompanying drawings, in which.

DETAILED DESCRIPTION

Figure 1:
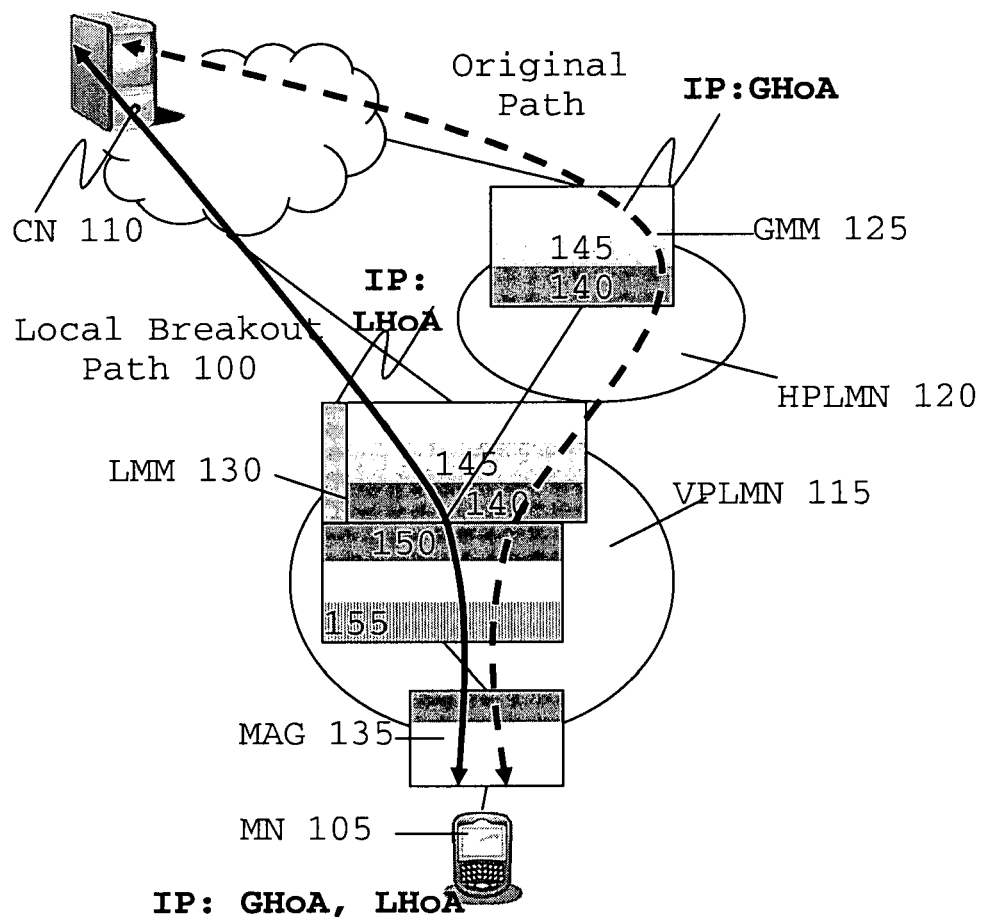
FIG. 1 illustrates a schematic diagram of a method for local breakout using two IP addresses.

FIG. 1 shows an overview of a general method for local breakout 100 between the MN, 105 and a corresponding node (CN) 110 according to the prior art. In FIG. 1 the mobile node (MN) 105 is roaming from the visited PLMN (VPLMN 115) to the home PLMN (HPLMN 120). The functionality of global mobility management (GMM 125) is located in the HPLMN and that of the local mobility management (LMM 130) is located in the VPLMN 115. Two IP addresses are assigned to the MN, one is a Global Home Address (GHoA) that is managed by the GMM and used for the global mobility, and one is a Local Home Address (LHoA) that is managed by the LMM 130 and used for the local breakout. The mobile access gateway (MAG 135) handles the mobility protocol on behalf of the MN.

In FIG. 1 the function modules of each node are illustrated. The function of a Mobility Anchor 140 provides the anchor point for the IP addresses managed by an IP Address Pool 145. A Mobility Agent 150 exchanges the mobility protocol with the Mobility Anchor on behalf of the MN. For the global mobility the MAG doesn't exchange the mobility protocol directly with the GMM but through the function of Mobility Anchor Proxy 155 of the LMM. The Mobility Anchor Proxy provides the mobility anchor not only for the LHoA but also for the GHoA as long as the MN roams from the VPLMN.

In the example shown in FIG. 1, the MN uses both GHoA and LHoA as the situation or policy demands. But this flexibility of using multiple IP addresses also causes some operational costs for the MN in various reasons. For example it is not always clear which IP address can be used and for what purpose.

The provision of local breakout is not typically deployed in most mobile networks, although a number of proposals of how this may be carried out have been made with respect to the 3GPP standards. A way to achieve local breakout would be to use a network address translator (NAT) function in a gateway of the visited network. This NAT would be applied to any local breakout traffic and map the home address of the user to and/or from a local address in the visited public land mobile network (VPLMN). The NAT would be placed at an anchor node in the visited network and be under the control of the home operator such that the home public land mobile network (HPLMN) remains in control of which traffic flows are allowed to go locally or otherwise. The result of this is the requirement to have a control interface between the HPLMN and VPLMN which can specify the traffic which should, and which should not, go through the home gateway.

By using the NAT function in the visited network gateway, the need of multiple IP addresses will vanish. However, when the MN changes the local mobility management during an LBO IP session, i.e. when the MN roams (or rather moves) from one visited network to another network and is detached from the visited network (the network in which the LBO session takes place) and attaches to the new visited network, which also may be the HPLMN, the local breakout session will discontinue. The session will discontinue because the mobility management of the new network will have no knowledge or information of the local breakout session between the MN and the CN. Other IP sessions using the GHoA as the MN's IP address may be maintained since the mobility protocol between the MN, LMM and GMM (e.g. GTP, PMIPv6, etc) support the session continuity for GHoA. But the LBO sessions will not be maintained mainly because the LHoA has to be used as long as the LBO session continues, even after the MN is detached from the visited network in which the LBO session took place. The current architecture (Evolved Packet Core (EPC) and Proxy Mobile IPv6 (PMIPv6)) does not support the session continuity for LHoA after the LMM has changed. Thereby the LMM for the LBO session does not have any routing path for GHoA after the MN has been detached from it. The destination address of downlink packets sent from CN will be converted from LHoA to GHoA at the NAT function in the LMM for the LBO session, but this LMM cannot route these packets to GHoA after the MN has been detached from it.

A similar problem appears in the LMM of the new network. After the MN attaches the new LMM (LMM2), the source address of the uplink packets will not be converted from GHoA to LHoA. So the CN will receive the uplink packets whose source address is GHoA. But this source address differs from that of the said LBO session, whose source address of uplink packets is LHoA. Then the CN will silently drop these packets or send Internet Control Message Protocol (ICMP) error packets to the MN.

In FIG. 1 the LMM, 130 is illustrated as two physical boxes, but it doesn't matter if it is implemented in a single box or if the functional split differs from that disclosed in FIG. 1. This assumption can also be applied to any MAG or GMM In the case of considering the architecture of evolved packet core (EPC), described in "GPRS enhancements for E-UTRAN access", 3GPP TS 23.401 V1.0.0, 2007-05, the GMM corresponds to the Packet Data Network Gateway (PDN GW), the MAG to the eNodeB or Serving GPRS Support Node (SGSN), and the LMM corresponds to the combination of PDN GW and Serving GW.

In the case of considering the architecture of PMIPv6, described in e.g. S. Gundavelli, K. Leung, V. Devarapalli, B. Patil, "Proxy Mobile IPv6," draft-ietf-netlmm-proxymip6-00, internet-draft, work-in-progress, the GMM corresponds to the Local Mobility Anchor (LMA), and the MAG to the MAG. Currently the PMIPv6 specification has no definition for the network node like LMM in FIG. 1, but it is natural thought that the LMM will consist of the LMA, MAG, and the proxy function of LMA (the function of Mobility Anchor Proxy in FIG. 1).

It shall be understood that the term mobile node used in the present application, concerns any kind of user equipment capable of performing a communication session with a corresponding node and being equipped with at least one IP address. A user equipment can e.g. be a mobile phone, a laptop, a PDA, etc.

Figure 2:
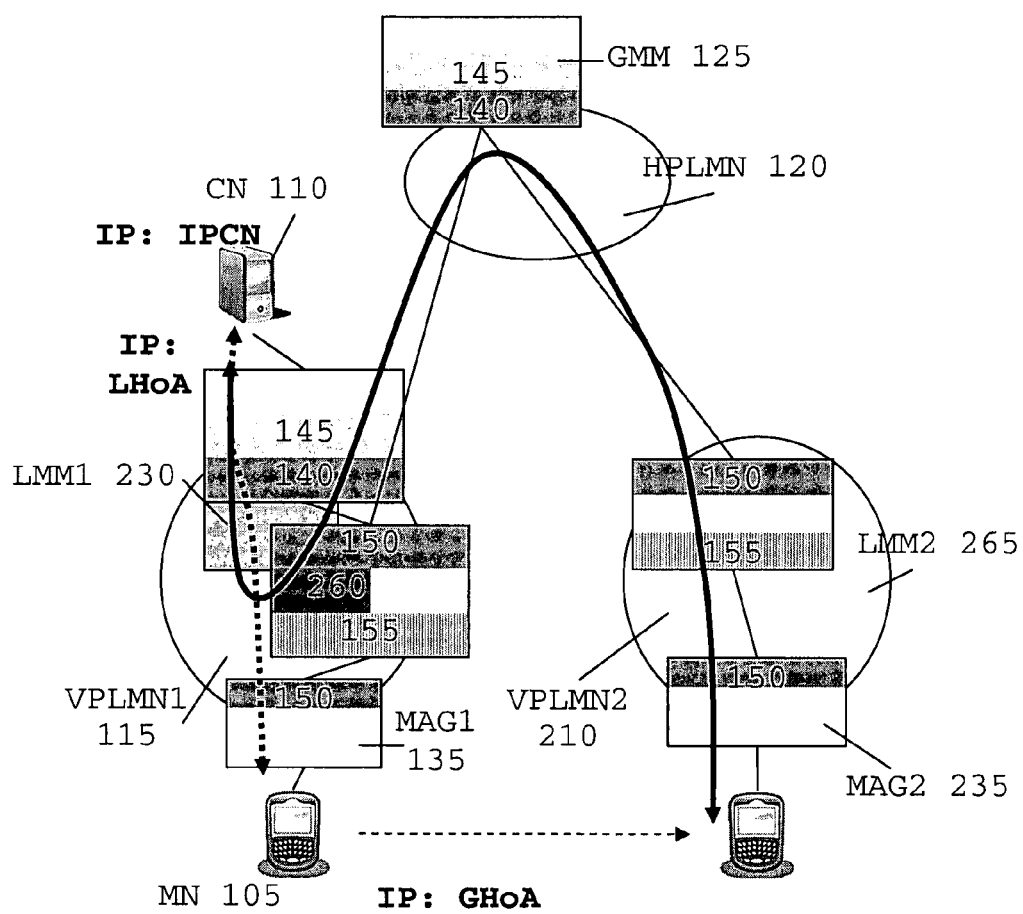
FIG. 2 illustrates a schematic diagram of a method for handling a local breakout according to a first embodiment of the present invention.

FIG. 2 shows a schematic diagram of a method for local breakout according to an embodiment of the present invention. For convenient reasons the devices and features that are the same in FIGS. 1 and 2 will use the same reference numbers as in FIG. 1.

Figure 3:
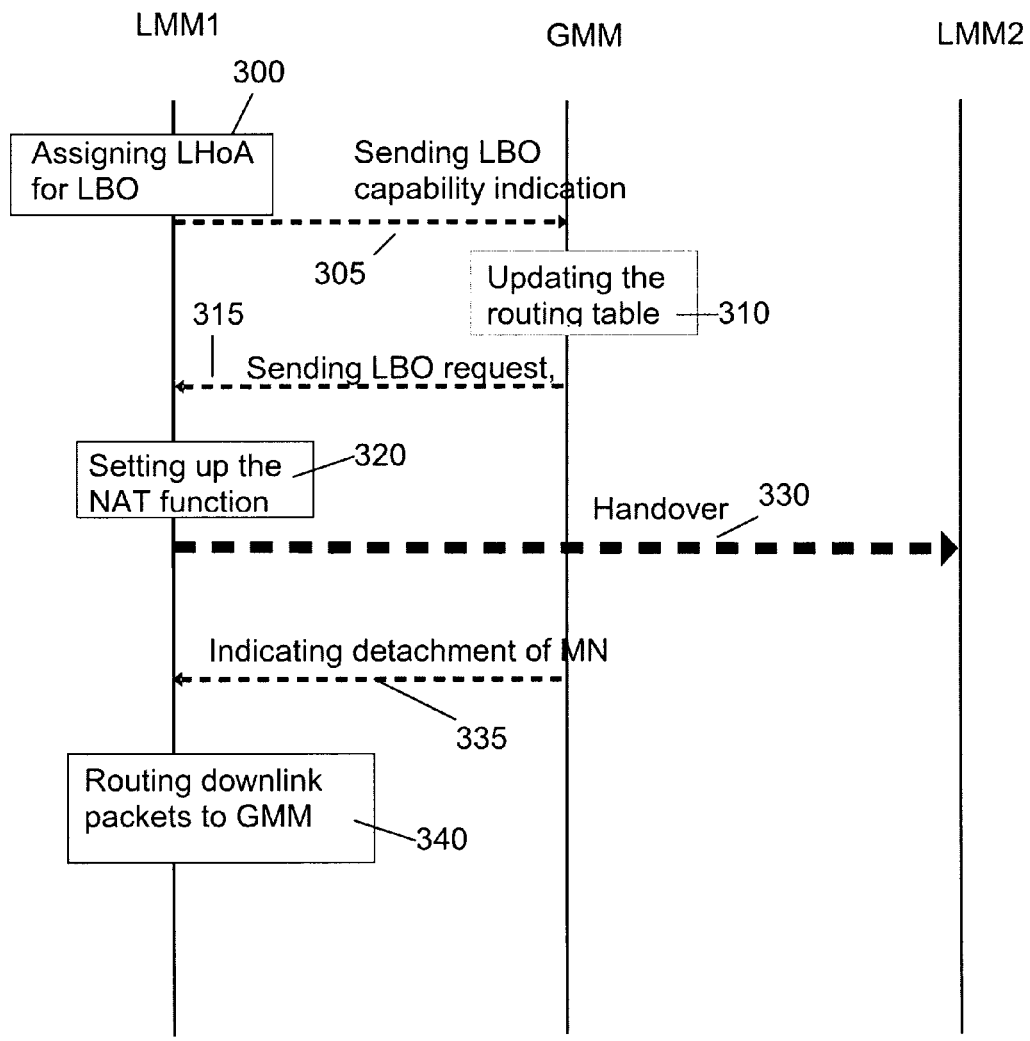
FIG. 3 illustrates schematically a diagram for signaling between nodes according to a first embodiment of the present invention.

A first embodiment of the present invention will now be illustrated with reference to FIGS. 2 and 3. In this embodiment the LMM1 230 is provided with a Network Address Translator (NAT) 260 facilitating local breakout even though the MN is provided with only one IP address.

First, the LMM1 230, which is the local mobility management, or the node, of the visited network in which the MN is located, assigns a local IP home address (LHoA) for the MN's LBO session. This is illustrated by a step 300 in FIG. 3. Thereafter, in step 305, the LMM1 sends the "LBO Capability Indication" to GMM. This indication includes the LHoA that was assigned in step 300 and the location of LMM1, e.g. IP address, APN, etc. The LMM1 indicates the GMM with this LBO Capability Indication that it has the capability to perform a local breakout. On receiving the "LBO Capability Indication" from LMM1, the GMM updates its routing table in step 310. This is done in order to route the uplink packets of an LBO session to the LMM1. At this moment, though, no LBO has been established and an LBO session taking place only in this visited network VPLMN1 would not go through the GMM. Routing through the GMM will be used after the MN moves to a different network. So far the MN has stayed within VPLMN1. In step 315, the GMM sends an "LBO request" to LMM1. On receiving the "LBO Request" from GMM, the LMM1 will in step 320 set up the NAT function. The message of the LBO Request includes the information that specifies the LBO session, e.g. Traffic Filtering Template (TFT). The LBO Capability Indication and the LBO Request used in the set up of an LBO session can be called LBO messages. The protocol used for those LBO messages is not relevant for this invention and can be chosen from a number of different protocols. When the NAT function is set up in step 320, the LBO session can be established between the MN and the CN via the NAT function in LMM1, where the destination address of the downlink packets is translated from LHoA to GHoA and the source address of the uplink packets is translated from GHoA to LHoA. In step 330 the MN performs a handover procedure from VPLMN1 to VPLMN2 210, and starts to roam from the new network VPLMN2. In step 335, the LMM1 receives the indication that the MN is detached from LMM1. This indication may come from the MAG1, i.e. the Mobile Access Gateway of the LMM1, perhaps when the MN is detached from MAG1, it may come from the GMM, or it can be detected by the LMM1 itself. Even though the indication comes from GMM in FIGS. 2 and 3, it doesn't matter where the indication comes from. On receiving the indication in step 335 that the MN has been detached, the LMM1 routes, in step 340, the downlink packets of the said LBO session to the GMM. The uplink packets from the MN are also routed to the LMM1 from the LMM2 265 via the GMM due to the routing set up in Step 310. Thereby, the new path for the said LBO session is established and the session continues. The new path will according to this embodiment be MN-MAG2, 235-LMM2-GMM-LMM1-CN.

The downlink packets of the local breakout (LBO) session are in this embodiment forwarded to the global anchor point or the Global Mobility Management (GMM 125) and then forwarded to the mobile node (MN) after the MN 105 moves to another Local Mobility Management (LMM2) 265, which can be located either in the same VPLMN 115 or in a new VPLMN, (VPLMN2), 210 or returns to its home PLMN 120. The Mobility Agent 150 and the Mobility Anchor Proxy 155 of the LMM2 265 and MAG2 235 function in the same way as corresponding devices function in LMM1 230. It will however be understood that all devices included in the mobility management nodes, etc., of the present application can be exchanged for similar devices as long as their combined functionality are essentially the same.

Figure 4:
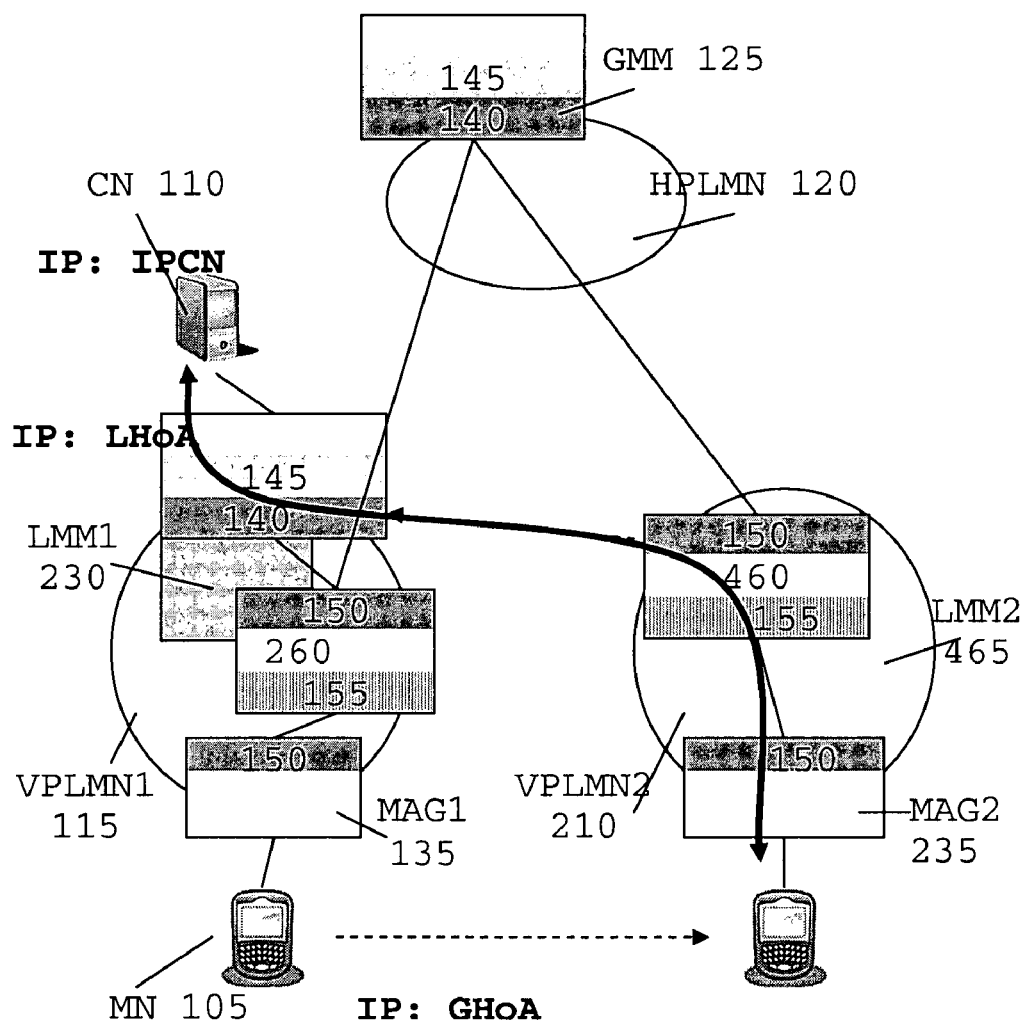
FIG. 4 illustrates a schematic diagram of a method for handling a local breakout according to a second embodiment of the present invention.
Figure 5:
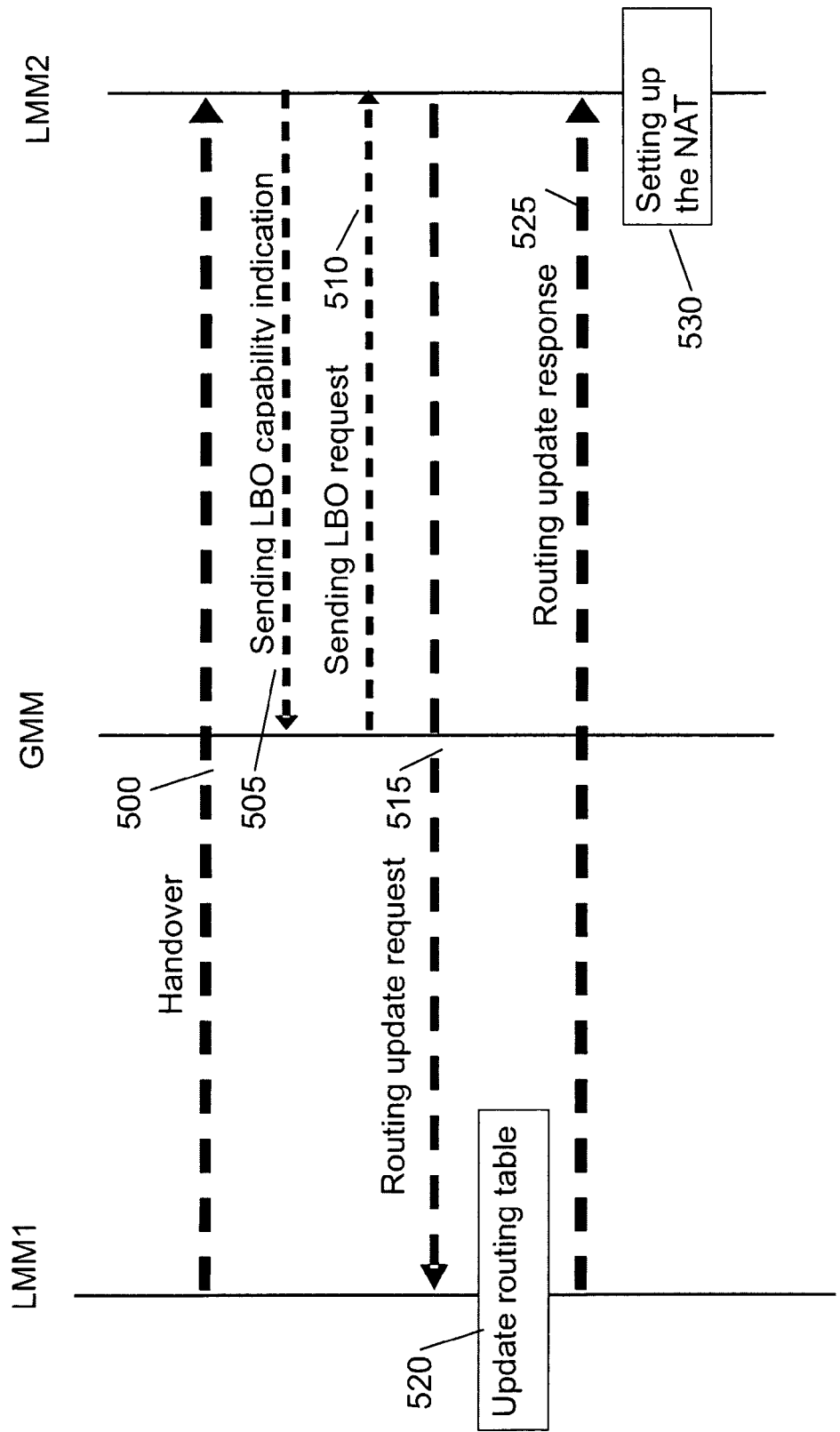
FIG. 5 illustrates schematically a diagram for signaling between nodes according to a second embodiment of the present invention.

A second embodiment of the present invention will now be illustrated with reference to FIGS. 4 and 5. This mode can be used as an optional extension for the basic mode described in FIGS. 2 and 3. This embodiment can only be performed if the new LMM, in this case the LMM2, i.e. the Local Mobility Management of the network that the mobile node/user equipment is roaming/moving to, supports the functionality of converting LHoA to GHoA and vice versa. If not, the first embodiment according to FIGS. 2 and 3 will be used. By the presence of LBO Capability Indication, the GMM can determine whether the LMM2 supports the LBO functionalities or not. An LBO Capability Indication is preferably only sent in connection with a handover. After handover, the procedure for this mode can be performed on a parallel with the first embodiment.

The embodiment starts when an LBO session between MN and CN already has been established, preferably in accordance with the steps 300-320 as described above.

First, after handover from LMM1 230 to LMM2 465 has taken place in step 500, the LMM2 sends the "LBO Capability Indication" to GMM 125 in step 505. Thereby the GMM is informed that the LMM2 is capable of performing a local breakout and thereafter the GMM sends an "LBO Request" (step 510) to LMM2 with information about LHoA and LMM1. The information about LMM1 includes for example IP address, Access Point Name (APN), etc. In step 515, the LMM2 sends a "Routing Update Request" to LMM1 in order to request LMM1 to forward the downlink packets being intended for the IP address LHoA to LMM2. The protocol to carry the Routing Update Request/Response between LMM1 and LMM2 can e.g. be PMIP, GTP, etc. On reception of the Routing Update Request from the LMM2, the LMM1 updates the routing table for LHoA in step 520. The routing table will then be configured to forward the downlink packets bound for LHoA directly to the LMM2. It means that these downlink packets will not be forwarded to the NAT function of LMM1 anymore, however the LMM1 will still provide the anchor point for the IP addresses managed by the IP Address Pool 145. The LMM1 then sends the "Routing Update Response" to LMM2 in step 525, informing LMM2 that all downlink packets for LHoA will be forwarded to LMM2. On receiving the Routing Update Response from LMM1, the LMM2 sets up the NAT function (step 530). Thereafter the NAT function in LMM2 will be used to process the uplink/downlink packets of the LBO session. The configuration parameters, e.g. TFT, LHoA etc, will be the same as that of LMM1. The new path for the said LBO session will according to this embodiment be MN-MAG2-LMM2-LMM1-CN and the session will be continued without having to go via the GMM.

A third embodiment of the present invention will now be illustrated with reference to FIGS. 2 and 6. This embodiment is an extension of the first embodiment but the schematic nodes, devices, etc. in FIG. 2 is, in connection with FIG. 6 which schematically illustrates the signaling between the nodes, sufficient to describe the embodiment. The third embodiment to be described starts when an LBO session between MN and CN already has been established, preferably in accordance with the steps 300-320 as described above.

First, in step 600, the LMM1 230, duplicates the downlink packets sent from the CN 110 of the LBO session and sends them to both MAG1 135 and GMM 125 (step 605). The packets sent to MAG1 will be received by the MN (this sending is not illustrated in FIG. 6). All packets that were duplicated in step 600 are cached in LMM1. The GMM receives the downlink packets of the LBO session from LMM1, and sends them back to the LMM1 based on the normal IP routing mechanism. This is illustrated in steps 615 and 620. The LMM1 will receive the downlink packets of the LBO session from the GMM. These packets have, however, already been cached in step 610, so the LMM1 will simply drop these packets in step 625. In step 630 the MN 105 performs a handover procedure from VPLMN1 115 to VPLMN2 210, and starts to roam from the new network VPLMN2. In step 635 the GMM will forward any downlink packets to LMM2 265 based on the normal IP routing mechanism. The GMM has continuously been receiving the downlink packets of the LBO session from LMM1 so there will be no interruption in the LBO session. The new path will according to this embodiment be MN-MAG2 235-LMM2-GMM-LMM1-CN.

In comparison to the first embodiment the steps 335 (indication that the MN has been detached from LMM1) and 340 (routing downlink packets from LMM1 to GMM) will be skipped from the procedure of this extension according to this third embodiment. Since the MN cannot receive the downlink packets of the LBO session during the performance of these steps 335 and 340 in the first embodiment, by incorporating this extension, the number of packet losses will be decreased. In particular, the time period when the MN cannot receive the downlink packets of the LBO session in the first embodiment will be the duration from when the GMM sends the signal to indicate that the MN is detached from LMM1 to when the GMM begin to receive the downlink packets of LBO sessions from the LMM1. So, it will be roughly the same as the round trip time between GMM and LMM1. Since in this embodiment the GMM is continuously provided with downlink packets from the LMM1 no information will be lost between the CN and the MN. Once the MN has been detached from the LMM1 all downlink packets will go via the GMM and the LMM1 will not be in connection with the MN so there will be no reason for the LMM1 to duplicate the packets henceforth. Neither will there be any reason for LMM2 to duplicate packets.

Figure 6:
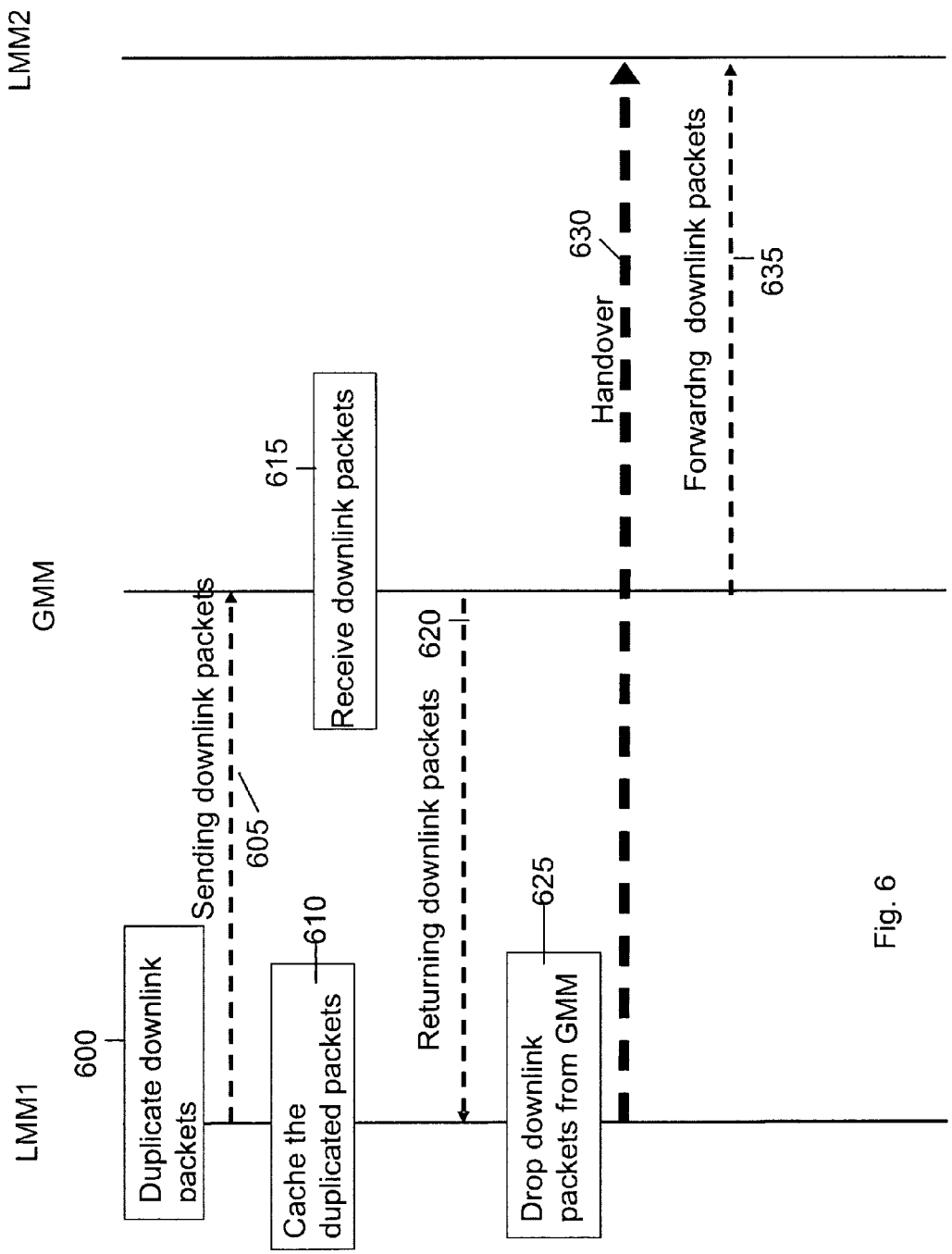
FIG. 6 illustrates schematically a diagram for signaling between nodes according to a third embodiment of the present invention.

Consequently, FIG. 6 schematically illustrates signaling between nodes according to a third embodiment of the present invention. This embodiment adds a bi-cast concept to the first embodiment in order to reduce the packet losses during the handover from MAG1/LMM1 to MAG2/LMM2 in FIG. 6. This extension is solely performed by LMM1. Any supports from GMM, MAG, and MN are not necessary. Although the GMM actually sends the duplicated packets back to the LMM1, it is a basic IP routing function (or GMM's function of basic mode) that is not special for this extension. After step 320 in the first embodiment, the procedure for this extension can be performed on a parallel with the first embodiment.

A fourth embodiment of the present invention will now be illustrated with reference to FIGS. 7 and 8. This embodiment is an extension of the second embodiment, described with reference to FIGS. 4 and 5, involving a bi-cast concept to the second embodiment in order to reduce the packet losses during handover.

The fourth embodiment to be described starts when an LBO session between MN and CN already has been established with the LBO session taking place over LMM2 and LMM1. It should be understood that the LBO session can take place over only one LMM as well as over two or even more LMM's. The use of two LMM's for the initial LBO session, as opposed to one LMM in the previous embodiments, is only chosen for illustrative reasons.

On receiving a routing update request for LHoA from LMM2, step 805 (see step 515 in the second embodiment), the LMM1 duplicates the downlink packets of the LBO session in step 810. One version of the packets is forwarded to LMM2, step 815, without being processed by the NAT function of LMM1. The other version of the packets is forwarded to the GMM in step 825 after being processed by the NAT function in step 820. Thus, GHoA is the destination address of the downlink packets forwarded to the GMM. On receiving the downlink packets of LBO session from LMM1 in step 815, the NAT function of LMM2 will process them in step 830 and then forward them to MAG2 (mot shown in FIG. 8). These packets will also be cached by LMM2. In step 835 the LMM2 will receive the downlink packets of the LBO session which was forwarded from the GMM. This is the packets that were duplicated in step 810 and processed by the NAT function in LMM1 in step 820. Since the same packets already have been cached by the LMM2 in step 830, these packets coming from the GMM will be dropped by the LMM2. In step 845, the MN performs a handover procedure from VPLMN2 210 to VPLMN3 710, and starts to roam from VPLMN3. Since the LMM3 765 is not provided with functionality for converting addresses (GHoA to LHoA and vice versa) the LBO session will be performed via the GMM. In step 850, the GMM thus forwards the downlink packets of the LBO session from LMM1 and to the LMM3 765 based on normal IP routing mechanism.

The new path for the LBO session is established and will according to this embodiment be MN-MAG3-LMM3-GMM-LMM1-CN and the session continues. If the LMM3 would be provided with functionality for converting addresses, the LBO session would more preferably follow the path MN-MAG3-LMM3-LMM1-CN.

Figure 7:
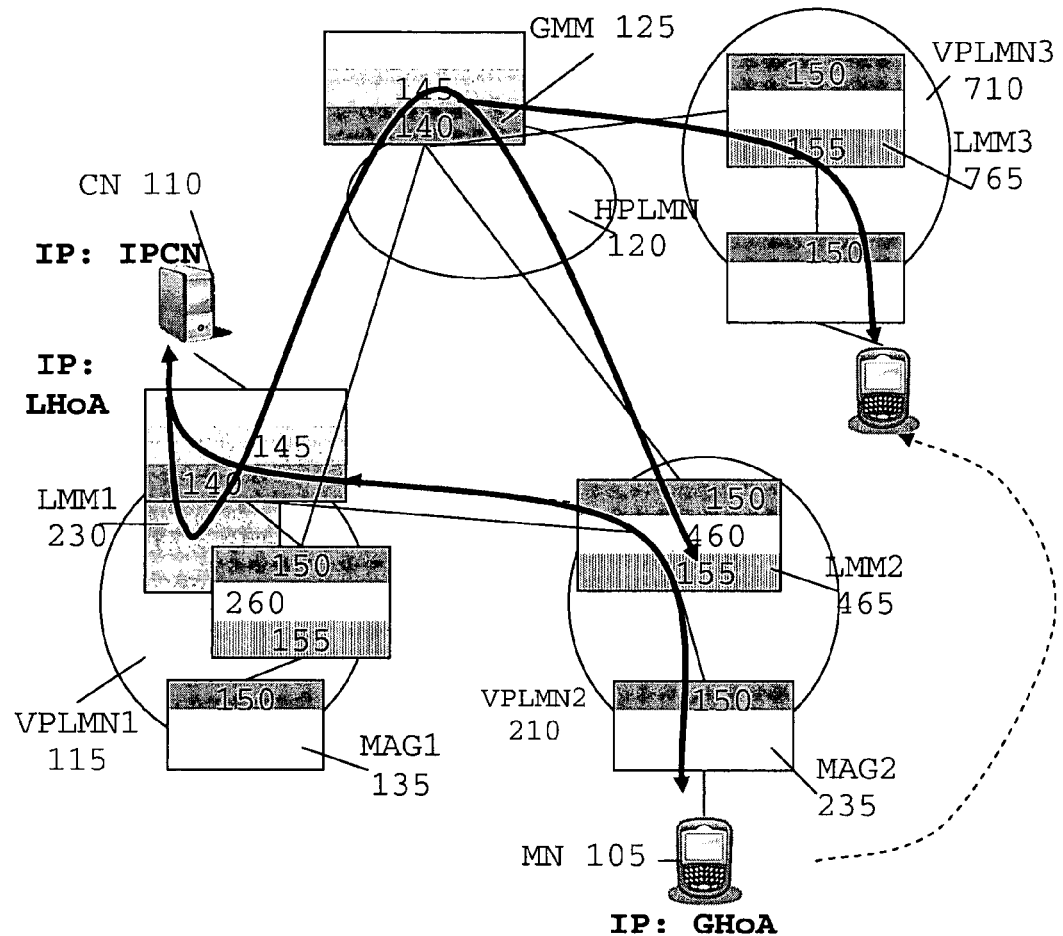
FIG. 7 illustrates a schematic diagram of a method for handling a local breakout according to a fourth embodiment of the present invention.
Figure 8:
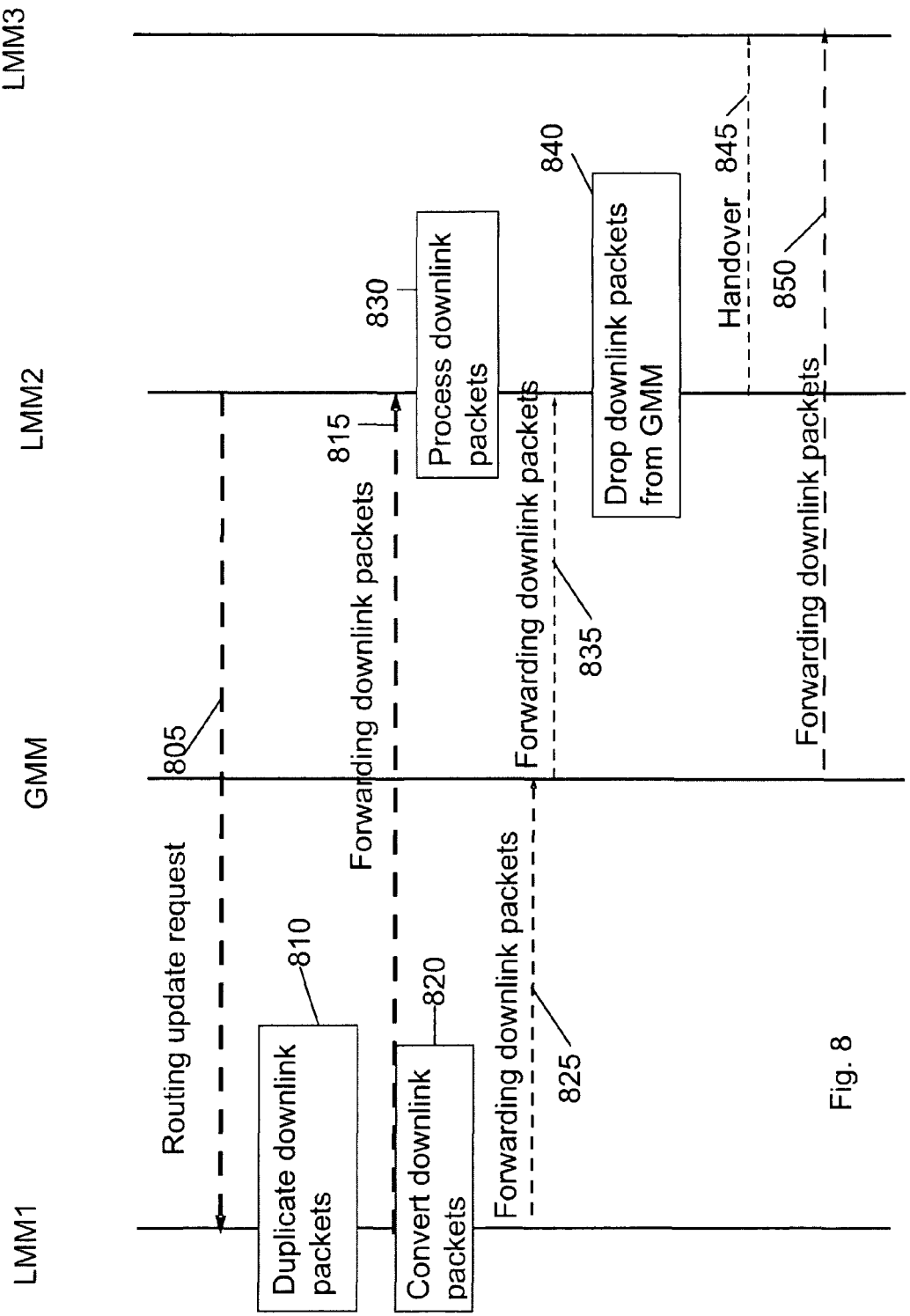
FIG. 8 illustrates schematically a diagram for signaling between nodes according to a fourth embodiment of the present invention.

FIGS. 7 and 8 show the second embodiment with bi-cast extension, which adds a bi-cast concept to the second embodiment in order to decrease the packet losses during handover. The handover can take place between arbitrary local mobility management nodes or mobile access gateway nodes, etc; e.g. from MAG2/LMM2 to MAG3/LMM3 as in FIGS. 7 and 8, or to MAG1/LMM1. This extension is performed by LMM1 and LMM2. Any support from the GMM, MAG or MN is not necessary. After step 515 in the second embodiment, the procedure for this extension can be performed on a parallel with the second embodiment. The packet losses will be decreased during the handover from MAG2/LMM2 to MAG3/LMM3. Comparing with the second embodiment without this extension, the downlink packets during the round trip time between the GMM and the LMM2 will be saved due to the same reason described with reference to the third embodiment.

The present invention as described in the previous embodiments can be mapped to Proxy Mobile IPv6 (PMIPv6) messages and EPC architecture. In the following, examples of how the signals in the embodiments of the present invention can be mapped to the existing mobility protocols (PMIPv6 and EPC), will be shown. However, this does not limit the possibilities of mapping to other protocols or messages.

The LBO Capability Indication and/or the LBO Request can be mapped to PMIPv6 as an extension to Proxy Binding Update/Acknowledgement; see S. Gundavelli, K. Leung, V. Devarapalli, B. Patil, "Proxy Mobile IPv6," draft-ietf-netlmm-proxymip6-00, internet-draft, work-in-progress for details; and it can be mapped to GPRS Tunneling Protocol (GTP), which is the protocol used in the EPC architecture, as an extension to Create PDP Context Request/Response. The LBO messages (Capability Indication and Request, i.e. the messages that initiate the set up of a new route for the LBO session) require the extension to the existing protocol. In the present invention the information about LHoA and LMM has to be additionally required to be transferred over the LBO Capability Indication and Request messages.

The Routing Update Request/Response, i.e. the request for updating the route for the LBO session sent to a node followed by the nodes' response, can be mapped to PMIPv6 as Proxy Binding Update/Acknowledgement, see S. Gundavelli et al. above, and to GTP as the message of S5 or S8 interface;

see "GPRS enhancements for E-UTRAN access", 3GPP TS 23.401 V1.0.0, 2007-05; (e.g. Bearer Update Request/Response).

The indication of the MN being detached from the LMM can be executed in a number of different ways. The indication may come from the GMM, Radio Access Network (RAN), or the link-layer, or by self-detection. It is enough to implement one of the methods described in the following.

For PMIPv6 the indication can e.g. be performed by MIPv6 Binding Revocation, see A. Muhanna, M. Khalil, S. Gundavelli, K. Chowdhury, P. Yegani, "Binding Revocation for IPv6 Mobility", IETF draft-muhanna-mip6-binding-revocation-01.txt, 2007-05; by Proxy Binding Update with an unspecified address for Care-of Address, see S. Gundavelli et al. above; by observing the bi-cast packets (only when bi-cast extension is performed); or from the link-layer, if the LMM and the MN share the link-layer.

For GTP the indication can e.g. be performed by the message of S5 or S8 interface or by the RAB Release message, both described in "GPRS enhancements for E-UTRAN access", 3GPP TS 23.401 V1.0.0, 2007-05; by observing the bi-cast packets (only when bi-cast extension is performed); or from the link-layer, if the LMM and the MN share the link-layer.

The existing mobility protocols can be applied for Binding Update Request/Response message without any modification.

According to an embodiment of the present invention a bi-cast flag can be included in a LBO Request message. By including this flag, the GMM can indicate which LBO session that should be bi-cast and which should not. As an alternative to including this flag, it can be deduced from the Quality of Service (QoS) specification. For example, if a QoS parameter requires a low packet loss rate for an LBO session, the LMM can apply the bi-cast extension for said LBO session. Thereby the bi-cast extension as described in embodiment three and four also can be applied to the embodiments as described in embodiments one and two when e.g. the LBO session is of high importance.

Figure 9:
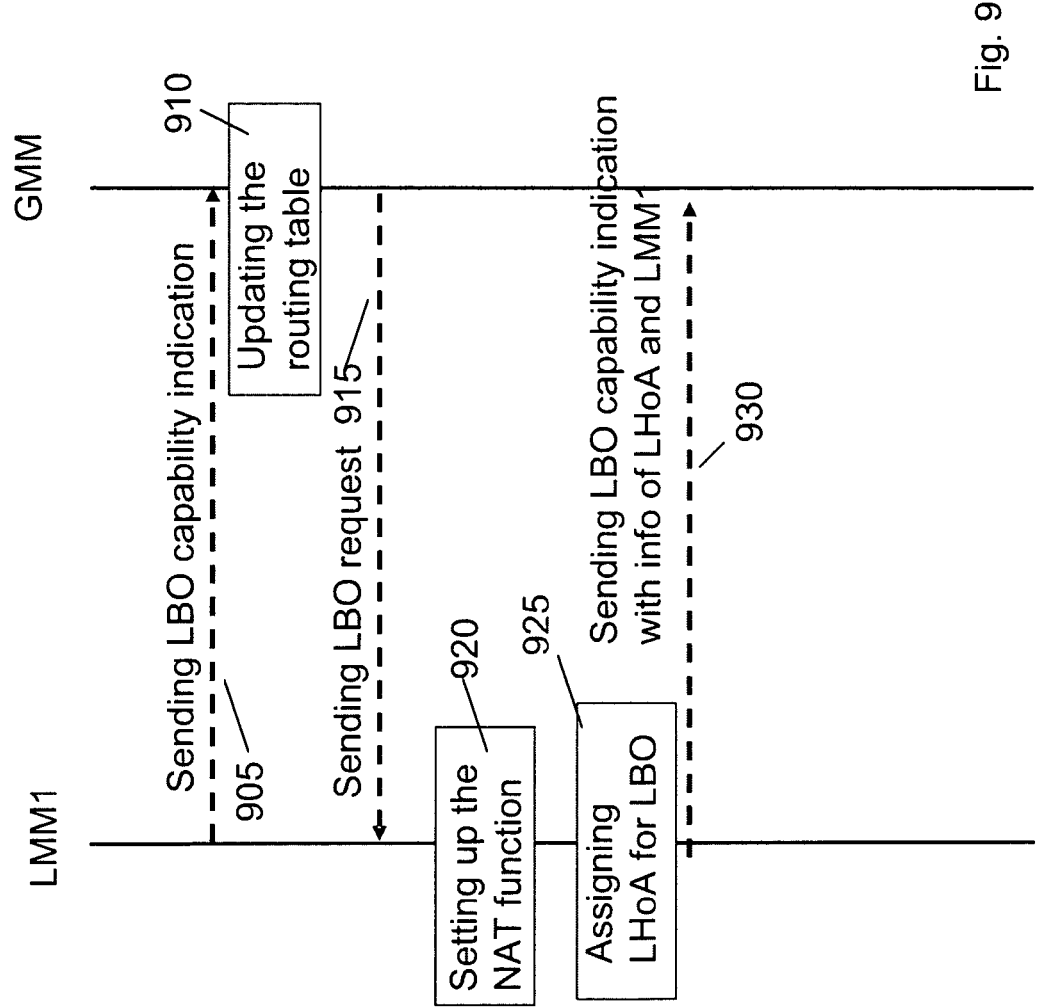
FIG. 9 illustrates schematically a diagram for signaling between nodes according to an alternative embodiment for setting up an LBO session of the present invention.

In the previously described embodiments LHoA is assigned for the MN before the actual LBO session is established. This becomes a problem if the address range for LHoA is limited (typically the case when LHoA is an IPv4 address). A solution to this problem will in the following be described with reference to FIG. 9, which schematically illustrates signaling between nodes according to an embodiment for setting up an LBO session of the present invention.

A method to set up an LBO session has already been described in the first embodiment. This embodiment suggests a different method for setting up an LBO session. Instead of assigning a local IP home address (LHoA) for the MN's LBO session as a first measure, before the actual LBO session is established, as in the first embodiment. This embodiment is initiated by, in step 905, sending an LBO capability indication from the LMM1 to the GMM. This indication only, in this embodiment, has to involve the information that the LMM1 has the capability to perform a local breakout. On receiving the LBO capability indication from LMM1, the GMM updates its routing table to route the uplink packets of the LBO session, in step 910. In step 915, the GMM sends an LBO request to LMM1. On receiving the LBO Request from the GMM, the LMM1 will in step 920 set up the NAT function and an LBO session between the MN and the CN can be established. After the LBO session is established the LHoA is assigned for the LBO session in step 925 and thereafter another LBO capability indication, this indication also containing information of LHoA and LMM1 (e.g. IP address, etc.), is sent to the GMM in step 930. According to this embodiment a dynamic allocation of LHoA is proposed and realized by sending two LBO Capability Indications; one before the session is established and one after the establishment.

A single IPv4 address will be possibly shared by multiple MN's when Network Address Port Translation (NAPT) or Network Address Port Translation-Protocol Translation (NAPT-PT) is used for the LBO sessions. NAPT will be problematic in an LBO session in which the GMM is not included in the LBO path, see second and fourth embodiment. In these embodiments the IP mobility protocol is used for Routing Update Requests/Responses, thereby the Routing Update Request/Response for a specific LHoA updates all the routes of LBO (and non-LBO) sessions that use the LHoA regardless of whether the session involves the MN that triggered the Routing Update Request/Response for the LHoA or not.

In order to avoid this problematic situation occurring with IPv4 addresses, the information about the port number and the transport protocol, e.g. TCP or UDP, of an LBO session has to be transferred together with the LHoA over Routing Update Requests/Responses and LBO messages.

For NAPT support the message formats of Routing Update Requests/Responses have to be modified if a new option or a new extension is added to the existing formats of the port number and the transport protocol, e.g. a Proxy Binding Update/Acknowledgement in PMIPv6.

In order to avoid the impact on the standard, the present invention proposes an NAPT address format to handle shared IPv4 addresses. IPv4 uses 32 bit addresses and IPv6 uses 128 bit addresses. The NAPT address format is used for the shared IPv4 address of 32 bit but it is transferred as an LHoA IPv6 address of 128 bit. An example of such an NAPT Address Format is shown in Format 1 in FIG. 10, in which the LHoA takes up 32 bit, the local port takes up 16 bit and the transport protocol takes up 8 bit.

Figure 10:
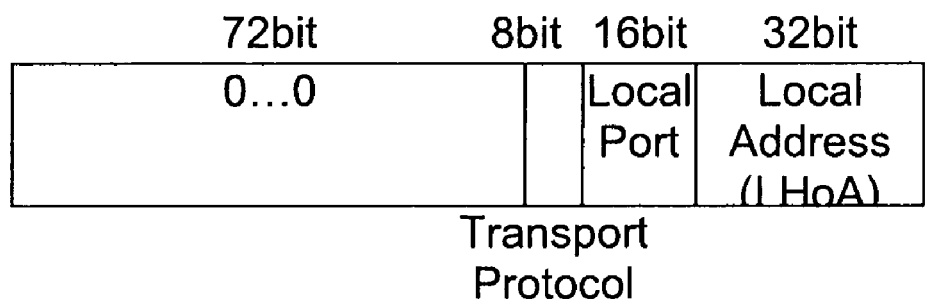
FIG. 10 shows block diagrams with two examples of NAPT Address Formats to be used in an implementation of the present invention.
Figure 10:
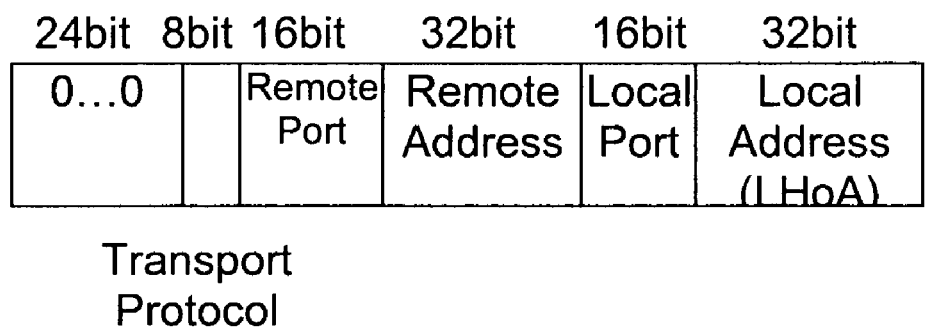

The address format as shown in FIG. 10 is preferably only used as an LHoA in the LBO messages and Routing Update Requests/Responses. For the LBO sessions the IPv4 address as specified by the local address field in FIG. 10 will preferably be used. If an LMM receives a Routing Update Request with an LHoA in this format (see e.g. step 520 in the second embodiment), the LMM will change the route of the downlink packets whose address, port and transport protocol are identified by the corresponding fields of this format. So, the route of another LBO session which e.g. may have the same IPv4 local address but a different port will not be changed.

In case the local port is also shared among multiple MN's, the remote address and the remote port, i.e. the address and the port belonging to the corresponding node (CN) are also included in the LHoA IP address format. An example of this is illustrated in Format 2 in FIG. 10.

Figure 11:
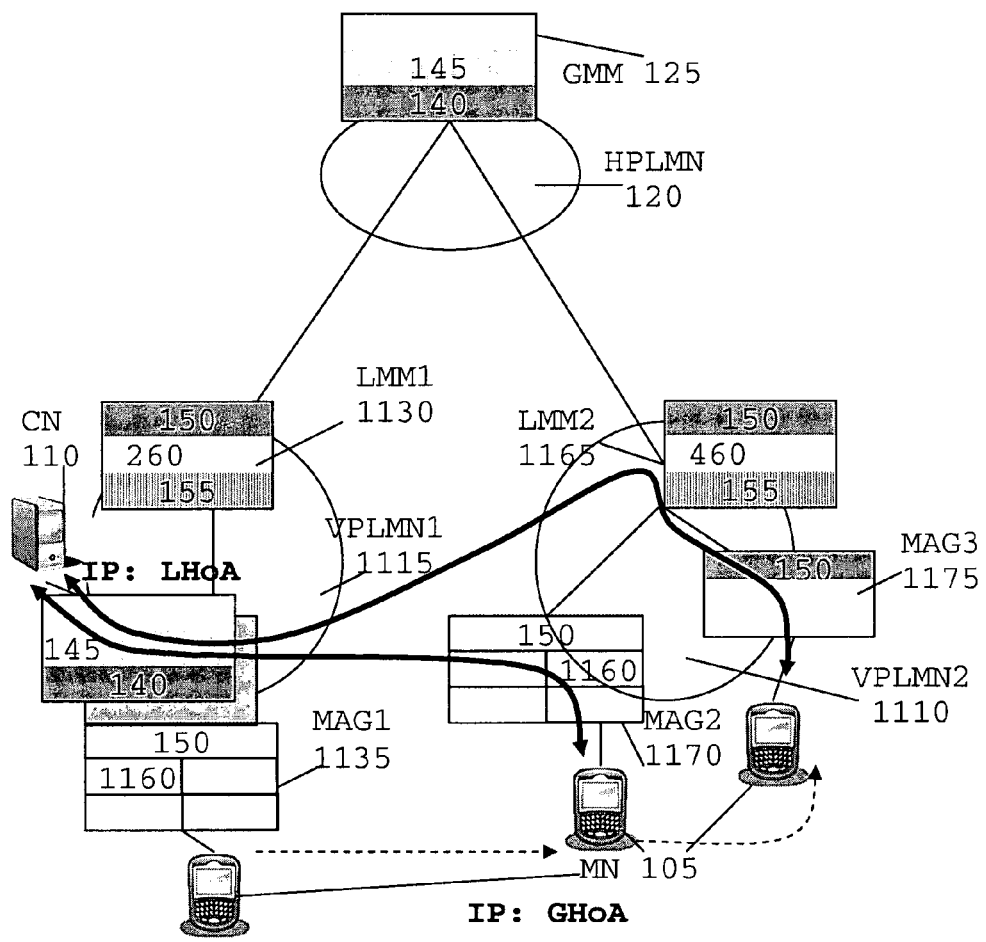
FIG. 11 illustrates a schematic diagram of a method for handling a local breakout according to a fifth embodiment of the present invention.

All embodiments described in the present application can be used in the hierarchical architecture. FIG. 11 illustrates a schematic diagram of a method for local breakout according to a fifth embodiment of the present invention, showing the second embodiment in the hierarchical architecture. A difference from the second embodiment is that the MAG1 1135 allocates the LHoA for the MN and the LBO session will take place via MAG1 instead of LMM1 1130. The LMM1 1130 and LMM2 1165 will only relay the LBO messages between MAG1 and the GMM and between MAG2 1170 and the GMM. So, the more optimized path (MN-MAG2-MAG1-CN) can be established if the MAG1 and MAG2 implement the LBO functionalities described in the present invention.

Figure 12:
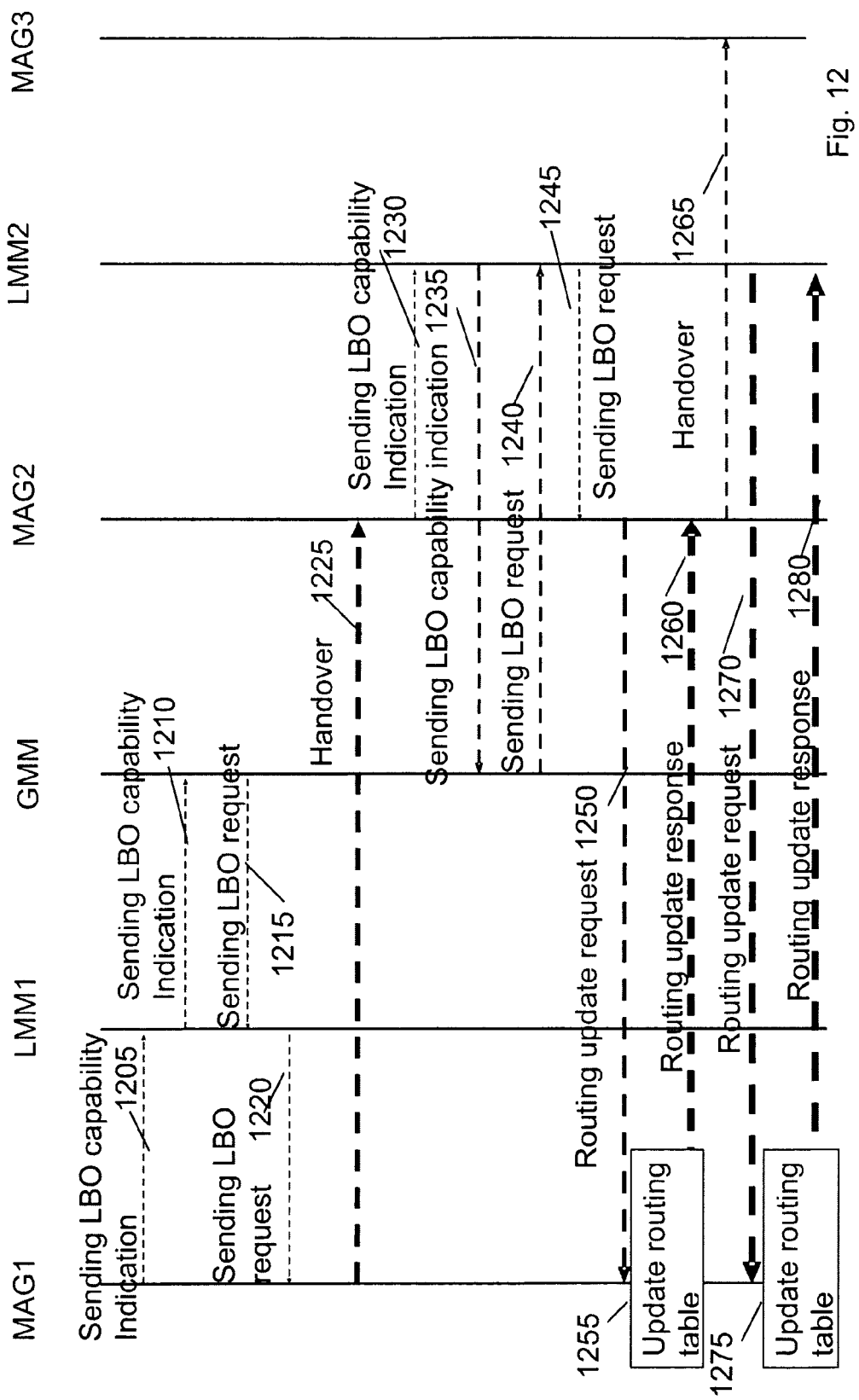
FIG. 12 illustrates schematically a diagram for signaling between nodes according to a fifth embodiment of the present invention.

FIG. 12 illustrates schematically signaling between nodes according to the fifth embodiment of the present invention, starting when an LBO session between MN and CN already has been established over LMM1. First, in step 1205, the MAG1 1135 sends an "LBO Capability Indication" to the LMM1 1130. The Mobile Access Gateways do not communicate directly with the Global Mobility Management, but the communication is directed to the Local Mobility Management of the MAG and is then forwarded to the GMM. This forwarding is performed in step 1210. Thereafter the GMM sends an "LBO Request" (step 1215) to LMM1 which is consequently forwarded to MAG1 in step 1220. An LBO session between the MN and the CN is then established over MAG1. In step 1225 the MN roams to a different network VPLMN2 1110 whereupon handover takes place. The steps 1205-1220 is then repeated in steps 1230-1245, now taking place between MAG2 1170, LMM2 1165 and the GMM. In step 1250, the MAG2 sends a Routing Update Request to MAG1 in order to request MAG1 to forward the downlink packets being intended for the IP address LHoA to MAG2. On reception of the Routing Update Request from the MAG2, the MAG1 updates the routing table for LHoA in step 1255. The routing table will then be configured to forward the downlink packets bound for LHoA directly to the MAG2. It means that these downlink packets will not be forwarded to the NAT function of MAG1 anymore. The MAG1 then sends the Routing Update Response to MAG2 in step 1260, informing MAG2 that all downlink packets for LHoA will be forwarded to MAG2. On receiving the Routing Update Response from MAG1 the MAG2 sets up the NAT function which will be used to process the uplink/downlink packets of the LBO session. The new path for the LBO session will according to this embodiment be MN-MAG2-MAG1-CN and the session will be continued. In step 1265 the MN roams to a different gateway, MAG3 1175, within the same network VPLMN2 and the same Local Mobility Management LMM2 1165. The steps 1250-1260 will then be repeated in steps 1270-1280, now taking place between LMM2 (instead of MAG2) and MAG1. MAG3 cannot be used in setting up the LBO session since the MAG3 is not provided with functionality for converting IP addresses.

As can be seen from steps 1270, 1275 and 1280 of this embodiment the LMM will perform the necessary procedure of converting the IP addresses of the downlink/uplink packets instead of the MAG if the MAG does not implement the LBO functionalities. The LMM2 will get to know the information about LHoA and MAG1 when relaying the LBO request (between step 1235 and step 1240), and get to know the fact that the MAG3 does not implement the LBO functionalities by the lack of LBO Capability Indication from MAG3. The LMM2 will therefore perform the converting procedure when the MN attaches to MAG3. Preferably the MAG's only send LBO Capability Indications to its LMM when the mobile node attaches to the MAG. The new path for the LBO session will according to this embodiment be MN-MAG3-LMM2-MAG1-CN after the handover to MAG3 has taken place.

Although the NAT (or NAPT) is used for converting the IP addresses of the uplink and downlink packets of the local breakout sessions as described in the present application, the present invention can be applied for other LBO methods or protocols. For example, Mobile Internet Protocol v6 (Mobile IPv6) (see D. Johnson, C. Perkins, J. Arkko, "Mobility Support in IPv6", IETF RFC 3775, 2004-06) can be used for the local breakout. Each mobile node is always identified by its home address, regardless of its current point of attachment to the Internet. While situated away from its home, a mobile node is also associated with a care-of address, which provides information about the mobile node's current location. IPv6 packets addressed to a mobile node's home address are transparently routed to its care-of address. The protocol enables IPv6 nodes to cache the binding of a mobile node's home address with its care-of address, and to then send any packets destined for the mobile node directly to it at this care-of address. Thus, by using LHoA as a care-of address the LBO messages will remain unchanged even if Mobile IPv6 is used for the LBO.

For example, assuming Mobile IPv6 is used in the third embodiment (FIGS. 2 & 6) instead of NAT. Though the context of Mobile IPv6 is more complicated than NAT (e.g. when it comes to the security association between the GMM (or the LMM1) and the CN), it is enough to transfer the LHoA to the LMM2. For example, in MIPv6 the security association is used to protect the integrity and authenticity of the signals (by Binding Update/Acknowledgement), but not used for the user traffic of the LBO sessions. So, it is not necessary to transfer the context of the security association in an LBO session. For the uplink packets of an LBO session using MIPv6 in the third embodiment, the LMM2 265 will change the source address from GHoA to LHoA and add a Home Address option (GHoA). For the downlink packets of the LBO session, the LMM2 will change the destination address from LHoA to GHoA and remove the Type 2 Routing Header. The Traffic Filtering Template, TFT, and the LHoA are enough information in order to perform these packet modifications in LMM2. The LMM will convert the uplink packets of the local breakout sessions from normal IPv6 packets to Mobile IPv6 packets, and vice versa for the downlink packets. The reason that the Type 2 Routing Header is removed is that it is mandatory for MIPv6 hosts, however it is not a mandatory function for all IPv6 hosts so it may be an unknown host for some IPv6 hosts.

Figure 13:
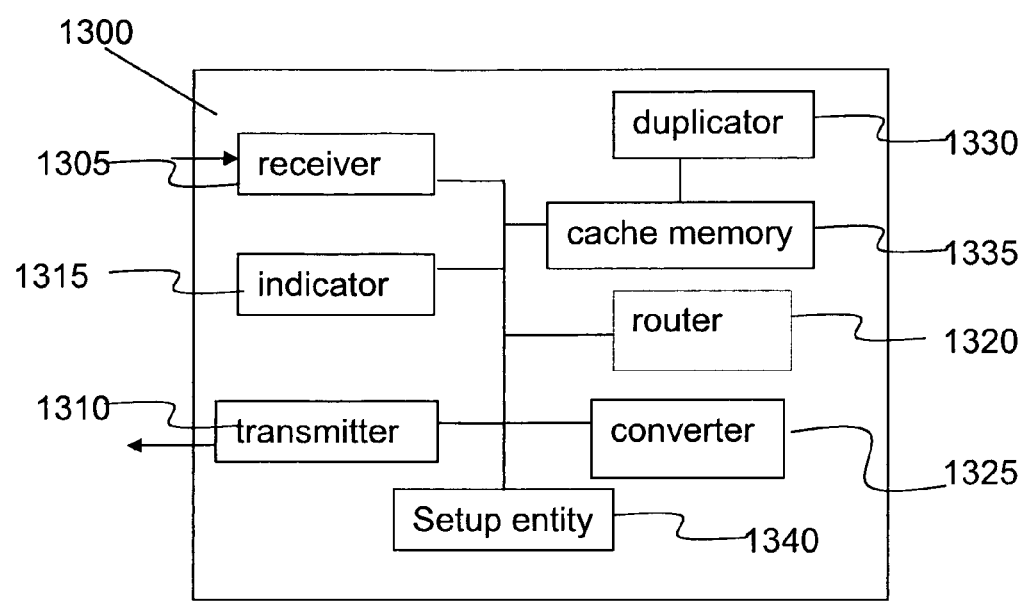
FIG. 13 illustrates a schematic block with the components of a node for handling a local breakout according to an embodiment of the invention.
Figure 14:
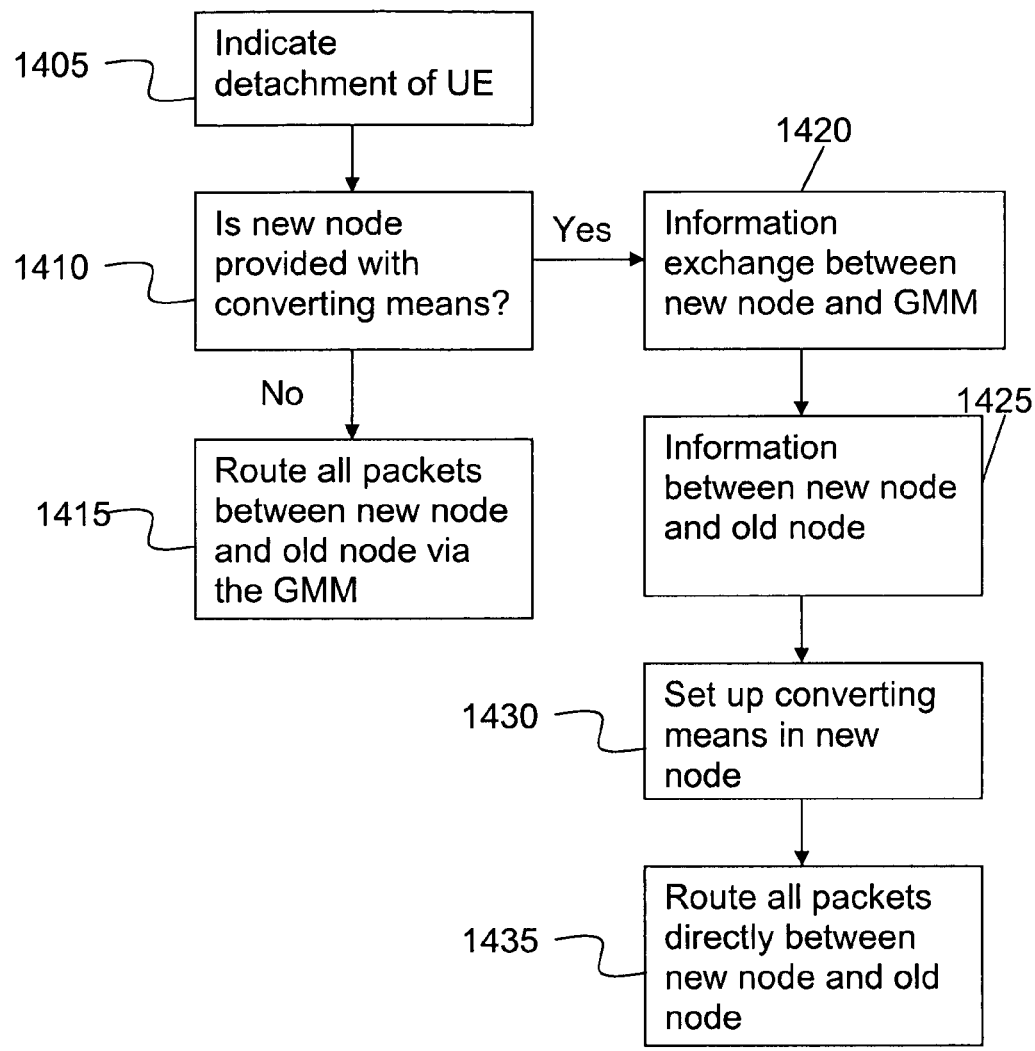
FIG. 14 is a flowchart illustrating a method of handling a local break out session according to the invention.

FIG. 13 illustrates schematically the components of a node 1300 for handling a local breakout according to an embodiment of the invention. The components are in this case implemented in a single box, however they can of course be implemented in many separate boxes. The node comprises a receiver 1305 and a transmitter 1310 for receiving and transmitting IP packets. It further comprises an indicator 1315 for indicating that a mobile node has been detached from or attached to the network that the node is in. The indicator is not an essential part of the node, since the indication can be sent from other devices within the network or from a separate network. The node comprises a router 1320 for routing IP packets to nodes located in other networks. Separate routers can be used for the downlink packets and the uplink packets. In the Mobile Internet Protocol the router is referred to as a mobility agent. Further, the node is provided with a converter 1325 for converting IP packet addresses from GHoA to LHoA and vice versa. In case the bi-cast extension is performed (third and fourth embodiments), the node is preferably provided with duplicating means 1330 for duplicating the downlink packets and caching means 1335 in order to cache the downlink packets such that packets being sent from the GMM that already has been duplicated can be dropped. The node is preferably provided with a setup entity 1340 for setting up the converter. The node can also e.g. contain a database for storing information regarding e.g. LBO sessions and a processor for analyzing incoming packets, etc. The node may e.g. be a local mobility management (LMM) or a mobile access gateway (MAG). Preferably the node further includes an IP address pool and a mobility anchor. In the case of the node being an LMM a mobility anchor proxy is preferably included in the node. FIG. 14 is a flowchart illustrating a method of handling a local break out session when a user equipment roams from one network to another. Note that this flowchart only describes the method according to the first and second embodiments. The bi-cast extension according to the third and the fourth embodiments are not described. Further, no communication between nodes within a network is described.

The method is initiated upon indication (1405) of the detachment of the user equipment from a node via which a local break out session is being handled. Before this detachment the LBO session has taken place in a first network and between the user equipment and a corresponding node. This node, the first node, or old node, is thus provided with means for allocating an IP address in form of a Local Home Address (LHoA) for the user equipment. After the detachment the old node will route all downlink packets to the GMM instead of to the user equipment. If the new node, i.e. the node in the new network which the user equipment becomes attached to, is provided with converting means, see 1410, this new node or second node will inform the GMM (1420) that it is provided with functionality for converting IP addresses by sending an LBO capability indication. However, if the new node in the new network (i.e. the second node in the second network) is not provided with this functionality the old node will continue to route all downlink packets to the GMM and then further to the new node (1415). Uplink packets will be routed in the opposite way from the new node to the old node. In case the new node is provided with conversion functionality the GMM will send an LBO request including information specifying the LBO session to the new node (1420). Thereafter the new node sends a routing update request (1425) to the old node asking the old node to forward downlink packets to the new node. Upon receiving the old node's response confirming the routing update request, the converter will be set up in the new node (1430) such that the IP addresses of downlink and uplink packets will be converted from LHoA to GHoA and vice versa. Thereafter, all packets will be routed directly between the old node and the new node.

A basic concept of the present invention according to all described embodiments is thus to use new methods for setting up IP packet routes to handle and maintain an LBO IP session between an MN and a CN while keeping the LMM providing the anchor point of LHoA as long as the said LBO IP session is kept alive.

List of abbreviations used in the present application
APN Access Point Name
BA Binding Acknowledgement
BU Binding Update
CoA Care-of Address
CN Corresponding Node
EPC Evolved Packet Core
GMM Global Mobility Management
GHoA Global Home Address
GTP GPRS Tunneling Protocol
GW Gateway
HA Home Agent
HoA Home Address
HPLMN Home PLMN
ICMP Internet Control Message Protocol
IP Internet Protocol
IPv6 IP version 6
LBO Local Breakout
LHoA Local Home Address
LMA Local Mobility Anchor
LMM Local Mobility Management
MAG Mobile Access Gateway
MIP Mobile IP
MIPv6 Mobile IPv6
MN Mobile Node
NAPT Network Address Port Translation
NAPT-PT NAPT and Protocol Translation
NAT Network Address Translation
NAT-PT NAT and Protocol Translation
PBA Proxy Binding Acknowledgement
PBU Proxy Binding Update
PDN Packet Data Network
PLMN Public Land Mobile Network
PMIP Proxy Mobile IP
PMIPv6 Proxy Mobile IPv6
RAN Radio Access Network
SGSN Serving GPRS Support Node
TFT Traffic Filtering Template
VPLMN Visited PLMN

The invention claimed is:

1. A method of handling a Local Break Out (LBO) session taking place in a first network between a corresponding node and a user equipment, when said user equipment is roaming from the first network to a second network, wherein the first network includes at least a first node that allocates an IP address in form of a Local Home Address (LHoA) for said user equipment, and where downlink packets are being sent from the corresponding node to the user equipment and uplink packets are being sent from the user equipment to the corresponding node, the method comprises the steps of:
   converting, in a conversion node in the first or the second network, the destination IP address of the downlink packets from an LHoA to a Global Home Address (GHoA);
   routing, from the first node, directly or indirectly to a second node in the second network, any downlink packets being sent from the corresponding node;
   converting, in the conversion node in the first or the second network, the source IP address of the uplink packets from a GHoA to an LHoA, wherein said step(-s) of converting the IP address(-es) of the uplink and/or downlink packets always is/are performed in a node in the network most recently entered by the user equipment provided that the node is provided with functionality for allocating an IP address in form of a Local Home Address (LHoA) for said user equipment such that the routing can be performed directly between the first and the second nodes; and
   routing, from the second node, directly or indirectly to the first node, any uplink packets being sent from the user equipment, wherein the new path for the local break out session takes place via at least the first node in the first network and the second node in the second network.

2. The method of handling a Local Break Out (LBO) session according claim 1, wherein said step(-s) of converting the IP address(-es) of the uplink and/or downlink packets is/are performed in the second node such that the routing can be performed directly between the first and the second nodes, wherein the second node is the conversion node.

3. The method of handling a Local Break Out (LBO) session according to claim 2, wherein the method further comprises the following steps in the second node:
   receiving an indication that the user equipment has entered the second network;
   routing, to a Global Mobility Management (GMM), information that the second node is provided with functionality for allocating an IP address in form of a Local Home Address (LHoA) for said user equipment;
   receiving information from the GMM regarding the LBO session; and
   setting up means for converting IP address(es) for uplink and/or downlink packets.

4. The method of handling a Local Break Out (LBO) session according to claim 1, wherein the method further comprises the following steps in the first node:
  receiving an indication that the user equipment has left the first network;
  routing any downlink packets being sent from the corresponding node to the second node in the second network via a Global Mobility Management (GMM).

5. The method of handling a Local Break Out (LBO) session according to claim 4, wherein said step(-s) of converting the IP address(-es) of the uplink and/or downlink packets is/are performed in the first node whereby all packets are routed via the GMM.

6. A method of handling a Local Break Out (LBO) session according to claim 1, wherein the method further comprises the step of:
  forwarding, from the first node, the downlink packets to both a Global Mobility Management (GMM) and the user equipment as long as the user equipment is located in the first network.

7. The method of handling a Local Break Out (LBO) session according to claim 1, wherein the method further comprises the step of:
  forwarding, from the first node, the downlink packets to both a Global Mobility Management (GMM) and the second node in the second network when the user equipment is located in the second network.

8. The method of handling a Local Break Out (LBO) session according to claim 7, wherein the method further comprises the steps of:
  receiving, in the second node, the downlink packets being sent from both the GMM and the first node; and
  dropping one of the duplicated packets.

9. The method of handling a Local Break Out (LBO) session according to claim 7, wherein the method further comprises the steps of:
  including, in a message sent from the GMM to the conversion node, information whether all downlink packets of the LBO session also should be sent to the GMM or not.

10. The method of handling a Local Break Out (LBO) session according to claim 7, wherein the method further comprises the step of:
  determining, from a Quality of Service specification, whether all downlink packets of the LBO session also should be sent to the GMM or not.

11. The method of handling a Local Break Out (LBO) session according to claim 7, wherein the method further comprises the steps of:
  routing, from the conversion node that is decided to convert the IP address(-es) of the uplink and/or downlink packets, to the Global Mobility Management (GMM), further information about the node and the Local Home Address (LHoA) for said user equipment after the LBO session has been established.

12. The method of handling a Local Break Out (LBO) session according to claim 1, wherein the first and/or second node is a Local Mobility Management (LMM).

13. The method of handling a Local Break Out (LBO) session according to claim 1, wherein the first and/or second node is a Mobile Access Gateway (MAG).

14. The method of handling a Local Break Out (LBO) session according to claim 1, wherein the method further comprises the step of:
  modifying an IPv4 address and sending it in an IPv6 format with fields containing at least information of LHoA, port and transport protocol.

15. The method of handling a Local Break Out (LBO) session according to claim 1, wherein the step(s) of converting the IP address(es) is/are performed by a Network Address Translator (NAT) located in the first or the second node.

16. A conversion node for handling a Local Break Out (LBO) session between a corresponding node and a user equipment taking place in a first network, the node comprising:
  an indicator indicating, or a receiver for receiving an indication, that the user equipment has been detached from the conversion node and has been moved to a second network;
  a router for routing, directly or indirectly to a second node located in the second network, any downlink packets being sent from the corresponding node;
  a converter for converting the destination IP address of the downlink packets from an LHoA to a Global Home Address (GHoA);
  a router for routing, to the communication node, any uplink packets being sent from the user equipment via the second node; and
  a converter for converting the source IP address of the uplink packets from a GHoA to an LHoA, wherein the local break out session can be maintained via at least said node and said second node when the user equipment moves from the first network to the second network, wherein converting the IP address(-es) of the uplink and/or downlink packets always is/are performed in a node in the network most recently entered by the user equipment provided that the node is provided with functionality for allocating an IP address in form of a Local Home Address (LHoA) for said user equipment such that the routing can be performed directly between the first and the second nodes.

17. A conversion node for handling a Local Break Out (LBO) session between a corresponding node and a user equipment, the node comprising:
  an indicator indicating, and/or a receiver for receiving an indication, that the user equipment has been attached to the conversion node and has been moved from a first network;
  a transmitter for sending information to a Global Mobility Management (GMM) stating that the node is provided with a converter for converting IP addresses;
  a receiver for receiving information regarding any LBO session the user equipment is involved in;
  a setup entity for setting up;
  a converter for converting the destination IP address of the downlink packets from an LHoA to a Global Home Address (GHoA); and
  a converter for converting the source IP address of the uplink packets from a
  GHoA to an LHoA, wherein converting the IP address(-es) of the uplink and/or downlink packets always is/are performed in a node in the network most recently entered by the user equipment provided that the node is provided with functionality for allocating an IP address in form of a Local Home Address (LHoA) for said user equipment such that the routing can be performed directly between the first and the second nodes;
  for any LBO session the user equipment is involved in; and
  at least one router for routing any uplink packets being sent from the user equipment to a first node that previously handled the LBO session in the first network; and for routing any downlink packets coming from the first node that previously handled the LBO session to the user equipment, wherein a local break out session can be maintained via at least said node and said first node that previously handled the LBO session when the user equipment moves to the node's network.

18. A node according to claim 16, wherein one router is arranged to handle the routing of both the downlink and the uplink packets.

* * * * *